P. A. ACHILLES.
PROCESS FOR THE MANUFACTURE OF HOLLOW BODIES OF PERFECT SHAPE.
APPLICATION FILED FEB. 8, 1913.
1,093,568.
Patented Apr. 14, 1914.
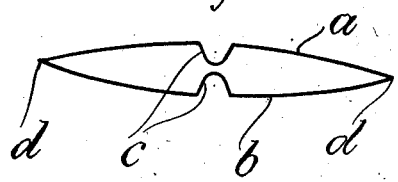
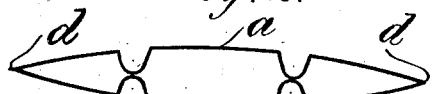
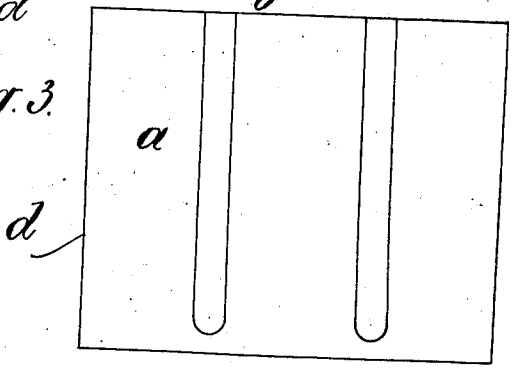
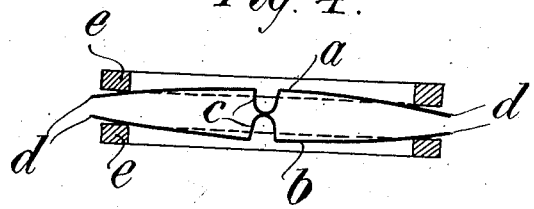

UNITED STATES PATENT OFFICE.

PAUL ALFRED ACHILLES, OF HAMBURG, GERMANY.

PROCESS FOR THE MANUFACTURE OF HOLLOW BODIES OF PERFECT SHAPE.

1,093,568.  Specification of Letters Patent.  Patented Apr. 14, 1914.

Application filed February 8, 1913. Serial No. 747,155.

*To all whom it may concern:*

Be it known that I, PAUL ALFRED ACHILLES, a citizen of the free State of Hamburg, residing at Hamburg, Germany, have invented certain new and useful Improvements in Processes for the Manufacture of Hollow Bodies of Perfect Shape, of which the following is a specification.

When hollow bodies for example are designed to be used as elements for radiators are made by welding or soldering together metal plates or cups there occur always tensions owing either to the imperfect shape of the parts to be soldered together or to the heat, and from these tensions result certain deformations or warping of the hollow bodies, particularly if the plates from which the hollow bodies are made exceed a certain dimension.

According to the improved process which forms the object of this invention this inconvenience is avoided by using special clamping devices for pressing together the edges of the plates or cups to be welded or soldered together in such a manner that the tensions produced by the welding or soldering are transmitted to other parts of the plates for example to the middle of the same. In order to prevent these tensions from deforming this middle part of the plates means are provided for strengthening or supporting said middle parts of the plates.

In the accompanying drawings different hollow bodies made according to this process are shown by way of example and the application of the process is illustrated.

Figure 1 is a cross section of a hollow body made according to the improved process, the plates having each a strengthening rib at the middle which serves for supporting said middle parts of the plates. Fig. 2 is a cross section and Fig. 3 is a plan view of a hollow body which has two strengthening ribs upon each plate. Fig. 4 illustrates the application of the process for the manufacture of a hollow body from two plates.

The improved process for manufacturing hollow bodies is as follows:—The plates $a$, $b$ to be welded or soldered together have strengthening ribs $c$ of such dimensions that if the two plates are placed the one upon the other (Fig. 4) their edges $d$ to be welded or soldered together are not in contact. The edges $d$ of the two plates $a$, $b$ are pressed the one against the other and maintained in contact during the soldering or welding by means of a convenient clamping device $e$. The tensions produced by the welding or soldering are thus transmitted from the edges $d$ to the middle part of the plates $a$, $b$, the strengthening ribs $c$ preventing the warping of said middle parts so that the shape of the hollow bodies is absolutely perfect.

Having thus described my invention what I claim is:—

1. Process for the manufacture of hollow bodies made from metal plates or metal cups welded or soldered together, consisting in supporting the middle parts of said plates in such a manner that the edges of the plates do not touch one another and in bringing said edges in contact and maintaining the same in contact during the welding or soldering by means of special clamping devices, the tensions produced by the soldering or welding being thus transmitted to the middle part of said plates, substantially as described and shown and for the purpose set forth.

2. Process for the manufacture of hollow bodies made from metal plates or metal cups welded or soldered together, consisting in supporting the middle parts of said plates by means of strengthening ribs provided in said plates in such a manner that the edges of the plates do not touch one another and in bringing said edges in contact and maintaining the same in contact during the welding or soldering by means of special clamping devices, the tensions produced by the soldering or welding being thus transmitted to the middle part of said plates, substantially as described and shown and for the purpose set forth.

In witness whereof I have hereunto set my hand in the presence of two witnesses.

PAUL ALFRED ACHILLES.

Witnesses:
 ERNEST H. L. MUMMENHOFF,
 IDA CHRIST. HAFERMANN.